United States Patent

[11] 3,570,781

| [72] | Inventor | Paul E. Allen<br>Ephrata, Pa. |
|---|---|---|
| [21] | Appl. No. | 755,040 |
| [22] | Filed | Aug. 26, 1968 |
| [45] | Patented | Mar. 16, 1971 |
| [73] | Assignee | Woodstream Corporation<br>Lititz, Pa. |

[54] REEL WITH INTEGRAL LINE STOP
2 Claims, 3 Drawing Figs.

[52] U.S. Cl............................................................ 242/84.21
[51] Int. Cl............................................................ A01k 89/00
[50] Field of Search............................................ 242/84.21,
84.21 (A), 84.2, 84.2 (A), 84.2 (F), 84.26, 84.1

[56] References Cited
UNITED STATES PATENTS
3,346,212  10/1967  Rouanet.................... 242/84.21

FOREIGN PATENTS
941,464  7/1948  France .......................... 242/84.21
1,462,387  11/1966  France .......................... 242/84.21(A)

Primary Examiner—Billy S. Taylor
Attorney—Jacobi, Davidson, Lilling & Siegel

ABSTRACT: There is disclosed a fishing reel of the spinning type having inter alia, and as conventional, a spool housing or cup and a spool reciprocally movable within the spool housing or cup. The spool housing, however, has a first forwardly disposed inner wall portion of a larger diameter than the adjacent second and rearwardly disposed inner wall portion thereof, and a line stop face joins such first and second wall portions. The line stop face is disposed to engage and direct expanding turns of line unwrapping from the spool forwardly of the face so as to prevent line and/or reel fouling.

PATENTED MAR 16 1971
3,570,781
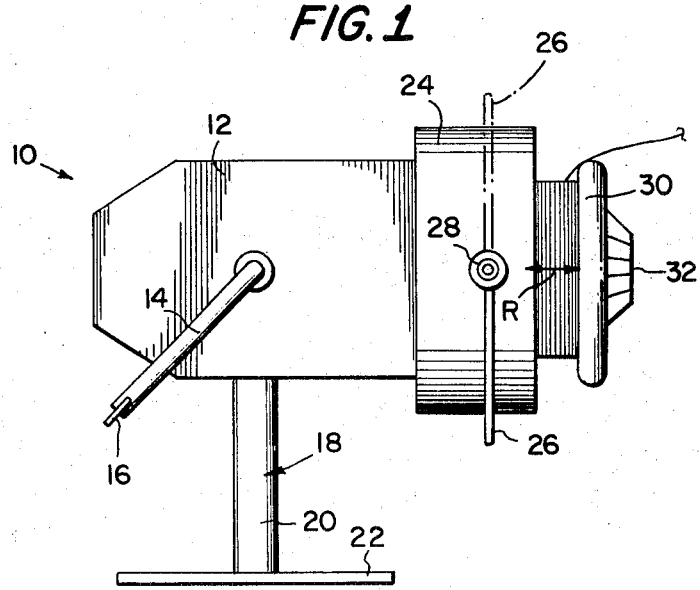
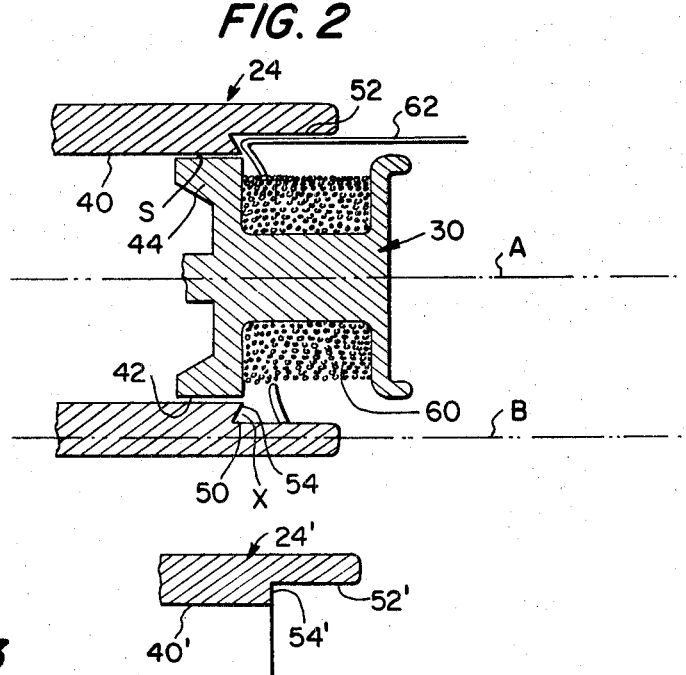
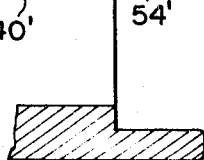
INVENTOR
PAUL E. ALLEN
BY Jacobi & Davidson
ATTORNEYS

REEL WITH INTEGRAL LINE STOP

BACKGROUND OF INVENTION

This invention relates to reels, and while not necessarily so limited finds particular utility when applied to fishing reels of the spinning type.

Fishing reels of the spinning type, for practical purposes, generally comprise a drive mechanism disposed within a drive housing, a stanchion for supporting such housing in proper relation to the fishing rod, a crank arm and handle for operating the drive mechanism, a spool carrying the fishing line, a spool housing or cup within which the spool is reciprocally movable, and a bail coupled with the spool housing and movable across the path of line coming from the spool. The drive mechanism is so constructed as to rotate the spool housing and reciprocate the spool.

Such general configuration of a spinning reel is well known in the art and accordingly the details of the same are not considered herein. At the same time, it is to be understood that while the common type of spinning reel includes the crank arm and handle, as mentioned, a newer form of such reel includes automatic means for driving the reel, and in particular a battery-operated electric motor in association with related drive components. The invention is equally applicable to this type of reel.

Regardless of the detailed construction or arrangement of the spinning reel, it has been found necessary to incorporate some means to effectively preclude the backlash of line behind the spool when the reel is used. In this respect, it is helpful to consider the operation of the reel.

Generally, when the reel is used, and the fisherman desires to cast therewith, a weighted object is attached at or near the end of the line so that when the rod with which the reel is associated is manipulated with the proper "whipping" action, the weighted object travels outwardly from the rod to the desired location. When so casting, the reel is set such that the line can come free from the spool thereon during the outward movement of the weighted object. The weighted object serves to maintain sufficient tension on the line during the time that it is traveling through the atmosphere that there is normally no backlash at the reel itself. However, when the weighted object hits the surface of the water, for example, the tension on the line is immediately reduced. The line which is unwrapping from the spool effectively stops at its outer end, but it does not instantaneously stop at the inner end adjacent the spool. As a result, the portion or portions of the line adjacent the spool which next come off of the spool tend to expand, or the turns increase in diameter.

This expansion of the turns of the line, with the resultant loss of tension thereon, permits the line and/or causes the line to tend to move between the area of clearance of the rear portion of the spool and the adjacent portion of the spool housing. If the line moves through this area of clearance and some portion of the line is disposed behind the spool, then as one starts to "reel in" or rotate the spool housing and reciprocate the spool, there is a fouling of the line and resultant unsatisfactory reel operation.

To overcome the foregoing problem, it has previously been suggested that a wiper-type member be located about the periphery of the rear portion of the spool so that the wiper-type member fills the area of clearance between the rear portion of the spool and the adjacent portion of the rotating spool housing. The wiper-type member, in many instances, essentially consists of a wire having short fabric or synthetic elements extending therefrom, so that the bristles can flex to accommodate the reciprocation of the spool and rotation of the spool housing. While this antibacklash type arrangement may be effective initially, it presents its problems.

Usually such a wiper arrangement requires installation when the reel is made. This in itself increases the cost of manufacture of the reel. Second, is the fact that the wiper element, regardless of form, tends to wear out with continued use of the reel and thus loses efficiency so that it must be replaced. Thirdly, and possibly of most significance is the fact that a wiper causes contact between the rotating head and the spool and being made of felt or the like it becomes embedded with sand and grit which causes a drag between the spool and the rotating spool housing.

With the foregoing in mind, it is a primary object of the present invention to provide in a reel of the aforesaid type, a simple, yet effective and inexpensive means for preventing line backlash and consequent fouling of the line.

SUMMARY OF THE INVENTION

Consistent with the aforesaid primary object of the present invention, it is a further object of the invention to accomplish the result by a relatively simple mechanical change in the structure of the reel spool housing. In this regard, the invention contemplates the provision of an offset in the spool housing, which offset essentially constitutes a ledge or abutment that stops the line from moving rearwardly during the time that it expands.

The invention will be better understood and objects other than those specifically set forth above will become apparent when attention is directed to the following detailed description. Such description makes reference to the annexed drawings in which:

FIG. 1 is a side view of an open-faced spinning reel of the type to which the present invention can be advantageously applied;

FIG. 2 is a fragmental detailed sectional view of a spool housing and spool, with the spool housing being constructed in accordance with the present invention; and FIG. 3 is a detailed fragmental sectional view of a modified form of spool housing constructed in accordance with the present invention.

Referring first to FIG. 1, it will be noted that the reel, generally designated 10, as shown therein includes a drive housing 12 which encloses a suitable drive mechanism (not shown). Extending to the side of the drive housing 12 is a crank arm 14 carrying a handle member 16 at the outer end thereof. The housing 12 further carries a stanchion member 18 including a post member 20 and a coupling member 22. The coupling member 22 is adapted to be attached to the fishing rod itself in conventional manner, as well known in the art, whereupon the post member 20 maintains the reel 10 in desired disposition with respect to the fishing rod.

Carried at the forward end of the housing 12 is a spool housing 24 and associated with the spool housing 24 is a bail 26 suitably pivoted, as at 28 so as to be movable, for example, from the solid line position in which it is shown in FIG. 1 to the dotted line position thereof. A spool 30 is disposed, as shown, at least partially within the spool housing 24 and is held in position by a cap retainer 32 which, in the normal instance, screws onto the reel drive shaft (not shown).

With a reel such as shown in FIG. 1, the housing 24 rotates when the crank arm 14 is rotated by moving the handle 16, and simultaneously therewith, the spool 30 reciprocates as indicated by the reverse arrow R. Since, as indicated above, the operation of this type of reel is well known, suffice it to say at this pint that the reel as shown in FIG. 1 is a conventional open-face spinning reel that operates in the conventional manner.

If reference is now made to FIG. 2, the preferred embodiment of the invention will be better understood. In FIG. 2, the spool housing is again designated by the numeral 24 and the spool is again designated by the numeral 30. The spool housing 24 has an inner wall 40 which is spaced slightly outwardly of the outer wall 42 of the rear flange portion 44 of the spool 30. In the space between the inner wall 40 of the spool housing and the outer wall 42 of the rear flange portion 44 of the spool, namely the space designated as S, the wiper-type element referred to hereinabove is normally disposed. However, consistent with the present invention, such wiper element is not utilized. Instead, the spool housing 24 is provided with a groove 50 therein, and the forward portion of the spool housing 24 has a wall 52 which is spaced outwardly of the wall 40. Phrasing this construction in other terms, the spool housing 24 has a forward end portion with an inner wall of a first diameter, a second and rearwardly disposed wall portion 40 with a smaller diameter, and an offset or groove 50 between such wall portions. In the embodiment shown in FIG. 2, the offset or groove 50 is a rearwardly directed groove, namely the face joining the wall 52 with the wall 40 is disposed at an acute angle outward and rearward with respect to the axis of rotation of the spool housing 24, and similarly with respect to the axis of reciprocation of the spool 30.

Referring now to the operation of the arrangement in FIG. 2, it will be noted that the line 60 has been schematically shown in FIG. 2. Obviously there would be more turns than shown in this FIG., but for purposes of simplicity, a minimum number of turns has been shown so that the operation of the present invention can be better appreciated.

In FIG. 2, it is assumed outer end of the line 60 which carries a weighted device, such as a fly, has hit the water and that the line is, at this time, free of tension thereon. As a result, the line 60 tends to flare outwardly. During casting, as the line expands from the spool and hits the rotating spool housing, it is stopped so that it can no longer expand outwards. Therefore it moves either forward or backward on the inner surface of the rotating spool housing. The line stop prevents it from moving backward and getting entrapped behind the spool. Also the rotating spool housing rotates as much as a full 360° prior to the bail tripping to pick up the line and then rotates even further then 360° to take up the slack line. During this time the spool may be travelling in a forward direction. Thus if the line slipped during casting a little way in back of the spool while the spool is coming forward, the line could now be quite far in back of the spool and foul the mechanism.

The one portion of the line designated by the numeral 62 in FIG. 2 is undergoing the aforesaid backlash action. It will be noted, however, that as this portion of the line undergoes this backlash action, it is engaged by the groove or offset 50 which in turn redirects the line forwardly, thereby precluding the line effectively from entering the space S and passing rearwardly of the spool, In other words, by providing this recess or line stop face 54 in association with the enlarged diameter forward portion of the rotating spool housing 24, one is able to preclude the backlash and provide a line stop in a manner which does not require a bristle-type element or any other type of element which will wear out, or collect sand and dirt and cause friction. Moreover, the groove and forward portion reduced wall arrangement can be incorporated at minimum cost during the formation of the spool housing and does not require any special assembly.

Although the reverse groove arrangement as shown in FIG. 2 is the preferred arrangement and appears to be most effective, a further modified arrangement is shown in FIG. 3. Here the spool housing is designated by the numeral 24', the forward wall portion of the spool housing by the numeral 52', and the rearwardly disposed wall portion of the spool housing by the numeral 40'. Between these respective wall portions 52' and 40', there is a face 54' which serves as a line stop face and which functions in substantially the same manner as the groove 50 or face 54 thereof. The difference resides in the fact that the face 54' is disposed perpendicularly to the axis of rotation of the spool housing or axis of reciprocation of the spool, as distinct from being disposed at an acute angle with respect thereto.

The angle of disposition of the abutment face located between the larger diameter forward inner wall portion of the spool housing and the smaller diameter rearwardly disposed wall portion of such spool housing can be varied depending on the type of reel and the desired efficiency. However, it has been found that such wall should in most all instances be disposed at an angle of between 25° and 95° with respect to an axis parallel to the axis of rotation of the spool housing. In this regard, the axis A shown in FIG. 2 is the axis of rotation of the spool housing and the axis of reciprocation of the spool. The axis B is an axis parallel thereto and an axis with which the angle X can be conveniently associated.

Before concluding, it is helpful to note that the location of the line stop face 54 is disposed adjacent the forward position of the spool rear flange portion 44 during its reciprocatory movement. This position is that shown for spool 30 in FIG. 2.

Having now described illustrative and preferred embodiments of the invention in considerable detail, it should be apparent that the objects set forth at the outset of the present specifications have been successfully achieved.

I claim:

1. In a fishing reel of the spinning type having a spool housing and a line spool reciprocally movable therein, the improvement comprising:
    a. said housing having a first forwardly disposed inner wall portion of a first diameter and a second rearwardly disposed inner wall portion of a second and smaller diameter;
    b. said housing having a circumferential line stop face joining said first and second wall portions, said line stop face being disposed to engage and direct line expanding and unwrapping from said spool forwardly of said face; and
    c. said line stop face being disposed at an acute angle outwardly and rearwardly with respect to the axis of reciprocation of said spool.

2. The improvement defined in claim 1 wherein said line spool has an enlarged rear flange portion, and said line stop face is disposed adjacent the forward position of said rear flange portion during reciprocation thereof.